Patented Jan. 31, 1939

2,145,799

UNITED STATES PATENT OFFICE 2,145,799

THERAPEUTIC PREPARATION

Horace M. Powell, Indianapolis, Ind., assignor to Eli Lilly and Company, Indianapolis, Ind., a corporation of Indiana No Drawing. Application December 11, 1937, Serial No. 179,374

3 Claims. (Cl. 167—65)

It is the object of my invention to produce a modified sulfanilamide which has certain therapeutic advantages over sulfanilamide itself.

Sulfanilamide, which is p-aminobenzenesulfonamide, has proven its efficacy as a therapeutic agent in combatting certain bacterial infections. However, it has not ordinarily proven effective in the treatment of virus infections; and even in the treatment of bacterial infections it requires fairly large and repeated doses. In addition, sulfanilamide itself has only a very slight solubility in water, of about 0.8%, so that when sulfanilamide is administered parenterally the volume of liquid to be administered is sometimes larger than is desirable.

I have discovered that by putting quinine salts and sulfanilamide together, I get a product which is effective in the treatment of certain virus infections; which is equally effective with sulfanilamide itself when administered in materially smaller dosages in terms of sulfanilamide content; which has sufficiently greater water-solubility than has sulfanilamide itself so that the concentration of sulfanilamide proper in the solution is increased several fold; and which is effective on either oral or parenteral administration.

The quinine salts which I use may be of various acids, such as a sulfate or a hydrochloride or a salicylate.

The quinine salt and the sulfanilamide may be put together in any desired proportions, although to get material benefit both ingredients should be present in substantial amount. For instance, I have found it effective with equal parts by weight, as of quinine salicylate and sulfanilamide, and also with equal molecular equivalents, as of quinine di-hydrochloride and sulfanilamide. Moreover, if a quinine hydrochloride or a quinine sulfate is used in such proportions, the solubility of the product is so changed that the concentration of the sulfanilamide proper in water solution is markedly increased— from about 0.8% to about 3.0% in the case of a product composed of equi-molecular proportions of quinine di-hydrochloride and sulfanilamide.

When suitable doses of these quinine-sulfanilamide preparations are administered hypodermically to mice infected with human influenza virus, it is found that they have marked beneficial therapeutic action against the effect of that virus, to the extent of saving the mice against from 1 to 10 fatal doses of the virus, as compared with similarly infected controls not treated with those preparations; whereas the sulfanilamide alone or the quinine salt alone, in equal or even greater dosage, is not able to save such mice.

In addition, it is found that in mice which are infected with hemolytic streptococci of such high virulence that control mice died when infected with one millionth of 1 cc. of the culture, the majority of the mice survived when infected with one hundredth of 1 cc. of the same culture if they are also treated subcutaneously with (a) 5 mg. of sulfanilamide, or with (b) 4 mg. of an equi-weight mixture of quinine salicylate and sulfanilamide (which thus contains only 2 mg. of sulfanilamide itself), or with (c) 5 mg. of an equi-molecular mixture of quinine di-hydrochloride and sulfanilamide (which thus contains only 1.5 mg. of sulfanilamide itself). In these tests two such doses of the drug were given each mouse, one an hour after the inoculation with the culture and the other five hours after that inoculation; and the mice were observed for a period of two weeks thereafter.

The quinine-sulfanilamide preparations may be either solutions of simple mixtures of a quinine salt and sulfanilamide, or solutions in which the desired separate amounts of a quinine salt and sulfanilamide are dissolved; or they may be solutions made by dissolving crystalline quinine-sulfanilamide preparations. Two such crystalline preparations are quinine hydrochloride and sulfanilamide containing two molecules of hydrochloric acid, and quinine hydrochloride and sulfanilamide containing three molecules of hydrochloric acid, in each instance with the quinine hydrochloride and the sulfanilamide in molecular proportions, and with the whole forming homogeneous crystals. Those specific crystalline products were produced by Elmer H. Stuart after I had discovered the therapeutic value of mixtures of quinine salts and sulfanilamide, and are the subject-matter of his patent application Serial No. 185,925, filed January 20, 1938.

I claim as my invention:

1. A therapeutic product containing a quinine salt and sulfanilamide.

2. A therapeutic product containing a quinine salt and sulfanilamide in substantially equal proportions by weight.

3. A therapeutic product containing a quinine salt and sulfanilamide in substantially equi-molecular proportions.

HORACE M. POWELL.

CERTIFICATE OF CORRECTION.

Patent No. 2,145,799. January 31, 1939.

HORACE M. POWELL.

It is hereby certified that error appears in the above numbered patent requiring correction as follows: In the grant, lines 2 and 13, the name of the assignee was erroneously written as "Eli Lily and Company" whereas said name should have been written as Eli Lilly and Company, as shown by the record of assignments in this office; and that the said Letters Patent should be read with this correction therein that the same may conform to the record of the case in the Patent Office.

Signed and sealed this 28th day of March, A. D. 1939.

Henry Van Arsdale.

(Seal) Acting Commissioner of Patents.